May 26, 1931.  F. KUNDERD  1,806,807
SHOCK ABSORBING LANDING STRUT FOR AEROPLANES
Filed Sept. 18, 1930    2 Sheets-Sheet 1
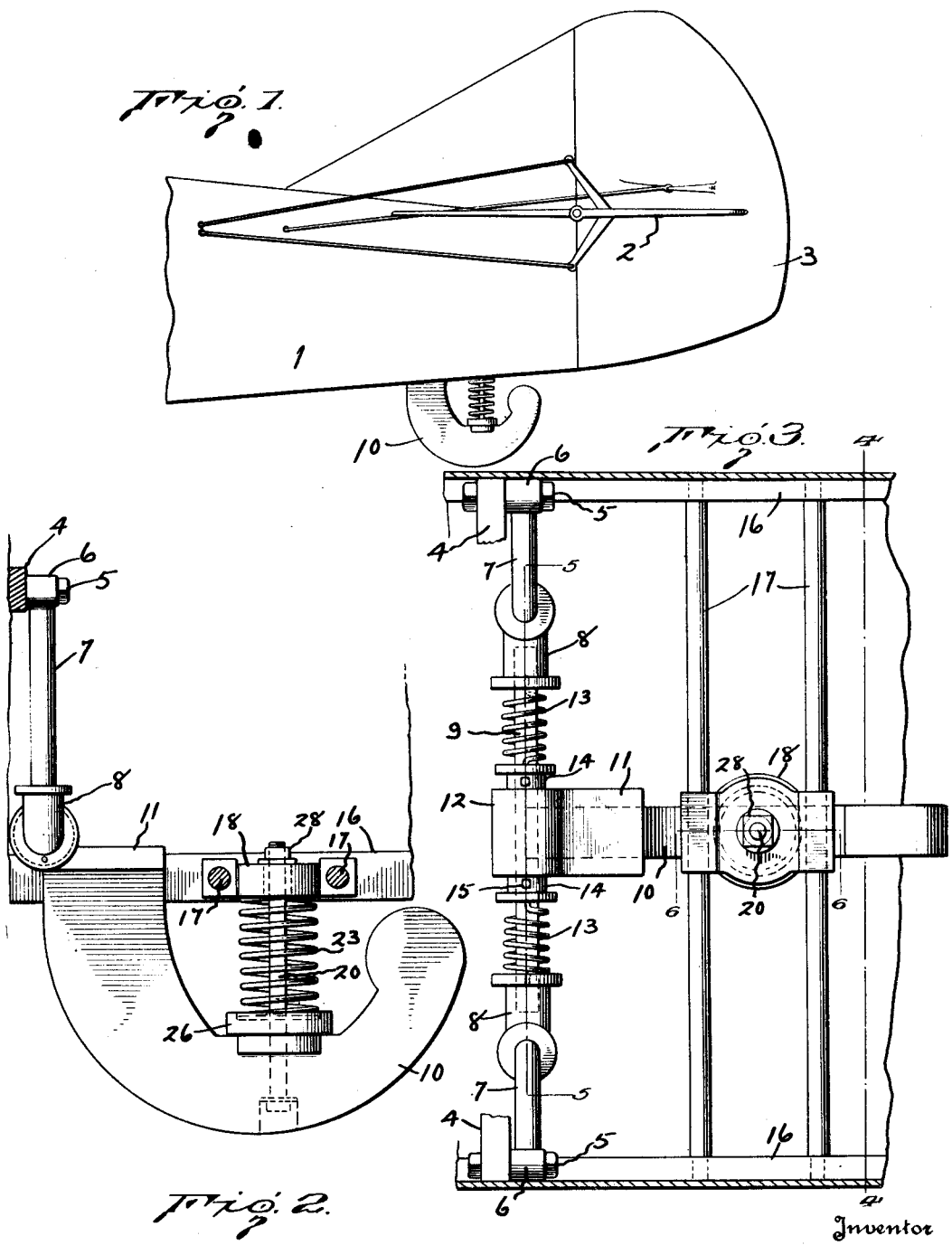
Inventor
Friederika Kunderd
By Louis C. Vanderlip.
Attorney

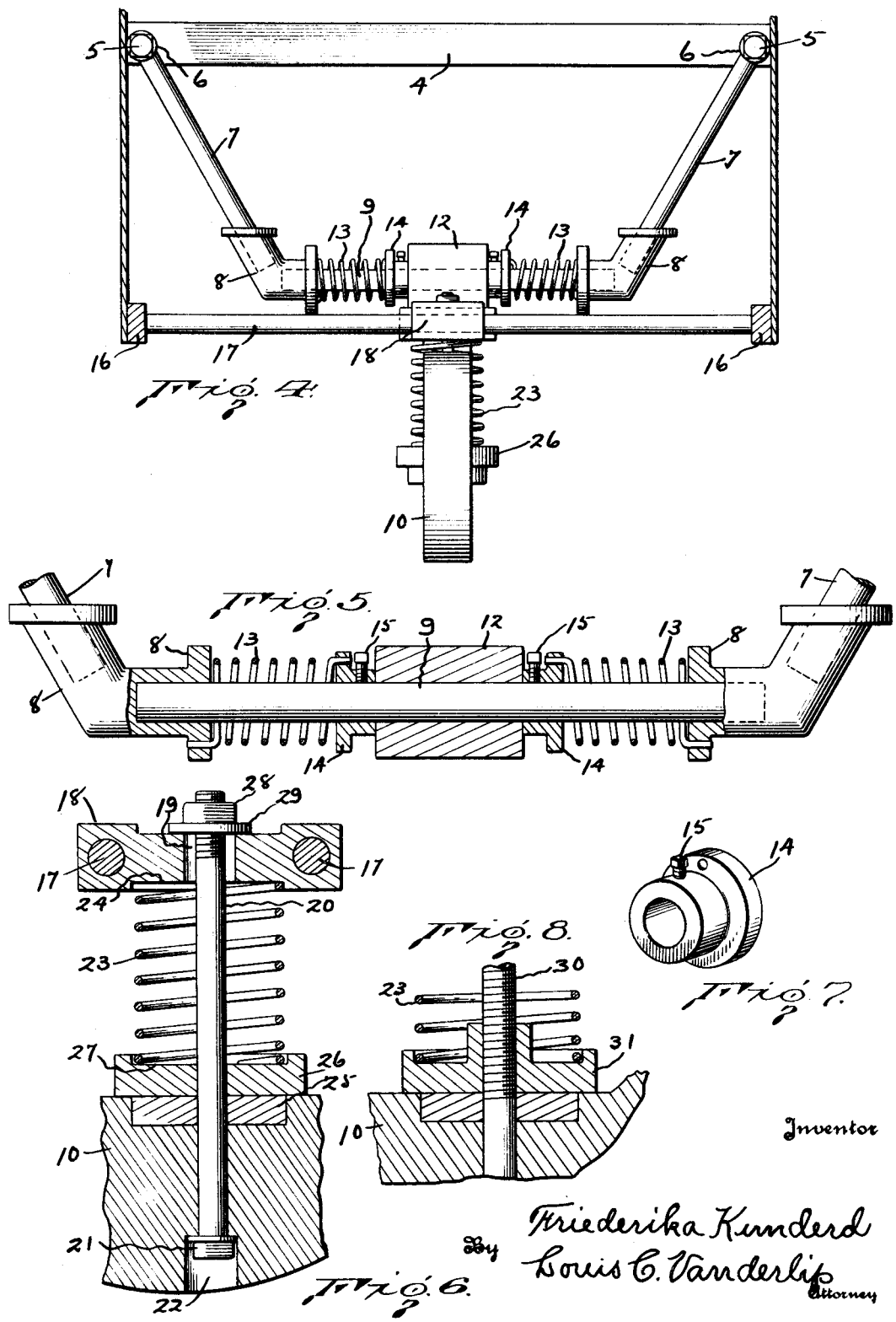

Patented May 26, 1931

1,806,807

UNITED STATES PATENT OFFICE

FRIEDERIKA KUNDERD, OF ELKHART COUNTY, INDIANA

SHOCK ABSORBING LANDING STRUT FOR AEROPLANES

Application filed September 18, 1930. Serial No. 482,753.

This invention relates to improvements in the landing gear of aeroplanes and particularly to shock absorbing struts for aeroplanes.

It is an object of the invention to provide a strut yieldingly supported on rigid elements of the aeroplane structure and adapted to receive and absorb the shocks which are encountered upon landing or taking off.

It is also an object of the invention to provide an element of landing gear which is yieldingly movable to a limited extent relatively to the plane structure in the direction in which the aeroplane travels while landing or taking off, while at the same time said gear is adapted to absorb the impact on landing and to yield when this impact takes place.

It is furthermore an object of the invention to secure a strut pivotally to the rigid structure of an aeroplane in such manner that it may be rocked against a certain resistance, this resistance being presented not only on the axis on which the pivotal strut is supported but also remote from the axis.

It is furthermore an object of the invention to provide a yielding landing gear of this type in which the resistance to be overcome may be varied.

With these and other objects in view embodiments of the invention are described in the following specification, in which a reference is made to the accompanying drawings.

In the drawings:

Figure 1 is a side elevation of a portion of an aeroplane and the landing gear connected therewith.

Figure 2 is a side elevation of the landing gear on a larger scale, partly in section.

Figure 3 is a horizontal sectional view through portions of the aeroplane showing a top plan view of the strut.

Figure 4 is a vertical section on line 4—4 of Figure 3.

Figure 5 is a similar section on a larger scale on line 5—5 of Figure 3.

Figure 6 is a fragmentary section through a portion of the strut and the spring absorbing a part of the impact.

Figure 7 shows perspectively one of the adjustment means, and

Figure 8 is a section through a portion of the strut similar to Figure 6 but illustrating a slightly modified embodiment.

The structure of the aeroplane is indicated by a fragment of the body 1 and the two rudders 2 and 3 with their actuating cables. The portion of the landing gear to which the present invention relates is embodied in a strut or support preferably mounted near the rear of the body and below the same and having crescent shape so as to scrape the surface of the ground along a portion of a curved edge. This strut is supported from the fuselage of the aeroplane in a manner illustrated primarily in Figures 2 to 5.

The respective parts of the fuselage are represented by the transverse bar 4 near the ends of which the bolts 5 are fixedly secured, these bolts also passing through the eyes 6 in the top ends of the bars 7, positioned angularly relatively to the axis of the aerial vehicle. The foot portions of the braces 7 are fixedly inserted in tubular angle brackets 8 having arms which are extended towards each other and away from each other respectively as shown in Figure 4. A shaft 9 is rotatably received within the branches of the brackets 8 which are directed towards each other and this shaft 9 forms the pivotal axis or support for the movable landing strut.

The latter has substantially the form of a crescent 10 of relatively small thickness, having a free rounded end. The other end of the strut is fixed to or formed integral with a bracket 11 which is firmly united with a sleeve or hub 12 rigidly fastened to the rock shaft 9 at approximately the center of the latter. It is obvious therefore that when the strut 10 is rocked through contact of the structure with the ground, any rocking movement imparted to the strut will also be communicated through the hub 12 to the shaft 9.

In order to oppose a predetermined resistance to this rocking movement of the combined strut and shaft, springs 13 are positioned on said shaft 9 between the brackets 8 and the hub 12 respectively. As shown in Figure 5, one end of the torsional springs 13 is inserted in the flange of the fixed bracket 8 which is firmly united with the brace 7 while the other end of each spring 13 is inserted in a collar 14 which is adapted to be adjustably positioned rotatably on the shaft 9 and which may be fixed thereon by a set screw 15 so as to vary depending upon the rotary adjustment of the collar 14 the tension to which the spring 13 is normally subjected.

Since the hub 12 is rigidly secured to the shaft 9 and the collars 14 also are fixed to said shaft through the set screws 15, it is obvious that upon a rocking movement being imparted to the hub 12 fixed to the strut 10, a rocking movement also will be imparted to the shaft 9, and the opposition against this rocking movement set up by the torsional springs 13 will have to be overcome, since one end of each of these springs is anchored in the immovable bracket 8.

The resistance against rocking of the strut 10 about the axis of the shaft 9 produced through the torsional springs 13 might possibly be insufficient to absorb the entire shock, and hence an additional shock absorbing means is inserted between the fuselage or body of the aeroplane and the strut 10, which last named shock absorbing means overlie substantially directly the point at which the strut enters into impact with the ground.

For this purpose the longitudinal fuselage elements 16 are connected by rigid transverse parallel bars 17 which support approximately in the plane of movement of the strut 10, a seat 18 in the shape of a heavy plate having a central bore 19. A rod or post 20 extends with considerable clearance through the bore 19 of the plate 18 as indicated in Figure 6 and the foot end of the post 20 entered within the body of the strut 10 is provided with an enlargement or head 21 which advisably is located within a socket or counterbore 22 of the strut.

A spring 23 is interposed between the lower face of the plate 18 and the upper face of the strut 10, the plate 18 being provided for this purpose with a recess 24 on its underface, and the strut having in its top surface a second plate or follower which by way of example is shown as being composed of two parts 25 and 26 respectively, the upper face of the follower 26 also being recessed as indicated at 27 to form a seat for the spring 23. An adjustment of the force by which said spring 23 is normally held compressed, is rendered feasible through the provision of a nut 28 engaging the projecting end of the post above the seat 18 in cooperation with a washer 29 resting on said seat.

In the modified embodiment shown in Fig. 8 the post 30 is provided with a screw threaded portion where it projects from the body of the strut 10 and a follower for the spring 23 is adjustably secured to said post 30 in the form of a plate 31 which has a tapped bore to cooperate with the screw threaded portion of the post 30.

It will be seen from the above that forces are exerted continuously upon the strut to rock it downward about its pivotal axis through the torsional springs 13 and through the compression spring 23, and that the pivotal movement in this direction is limited in accordance with the variable effective length of the post. The springs set up the resistance against a pivotal rocking movement of the strut in the opposite direction, which movement would be produced upon landing, and they also assist in the take off. In this manner the shocks incident to landing operations are absorbed by a plurality of springs without requiring the arrangement of telescoping elements, plungers, fluid chambers or the like.

Claims:

1. In a landing gear for aeroplanes, the combination of a strut, a transverse shaft to which the strut is secured, means for mounting said shaft pivotally in the aeroplane, and springs acting on said shaft for normally urging said strut and shaft in a predetermined direction.

2. In a landing gear for aeroplanes, a member transversely extending of the plane, a rock shaft means for connecting said rock shaft with said member, a strut fixedly attached to said rock shaft and springs interposed between said connecting means and said rock shaft, said springs having a tendency to turn said rock shaft in a predetermined direction.

3. In a landing gear for aeroplanes, the combination of a rock shaft extending transversely of the aeroplane, a strut fixedly connected to said rock shaft, springs mounted on said rock shaft and having a tendency of normally turning it in a predetermined direction, and means connected with the strut and with the aeroplane for limiting the movement imparted to said shaft and strut by said springs.

4. In a landing gear for aeroplanes, the combination of a rock shaft extending transversely of the plane, a strut having a lower curved edge and fixedly secured to said rock shaft, means for normally turning said rock shaft and strut in a predetermined direction, and means for rotatably supporting said rock shaft at its ends in respect of the aeroplane.

5. In a landing gear for aeroplanes, the combination of a transverse rock shaft, a crescent shaped strut fixedly secured to said rock shaft, springs acting on said rock shaft and normally forcing it in a predetermined direction, and an additional spring seated on a portion of the aeroplane and acting on said rock shaft.

6. In a landing gear for aeroplanes, the combination of a rock shaft, brackets at the ends of the rock shaft in which the same is rotatably secured, bars fixedly connecting said brackets with the sides of the aeroplane, a strut fixedly secured to the rock shaft centrally thereof, torsional springs connected with said brackets and the rock shaft and adapted to turn the shaft in a predetermined direction, transverse bars extending between the sides of the plane, a plate fixedly secured to said transverse bars, a post adjustably connecting said plate and said strut, and a spring interposed between said plate and strut and encircling said post.

FRIEDERIKA KUNDERD.